W. H. ROBARTS.
Tires for Vehicle-Wheels.

No. 157,420.  Patented Dec. 1, 1874.

WITNESSES:
Jas. E. Hutchinson
J. W. Meister

INVENTOR.
William H. Robarts
Edson Bros.
Attorneys.

UNITED STATES PATENT OFFICE.

WILLIAM H. ROBARTS, OF COLUMBUS, GEORGIA.

IMPROVEMENT IN TIRES FOR VEHICLE-WHEELS.

Specification forming part of Letters Patent No. 157,420, dated December 1, 1874; application filed August 1, 1874.

*To all whom it may concern:*

Be it known that I, WILLIAM H. ROBARTS, of Columbus, in the county of Muscogee and State of Georgia, have invented a certain new and useful Improvement in Tire-Fastenings, of which the following is a full, clear, and exact description, reference being had to the annexed drawing, in which—

Figure 1:
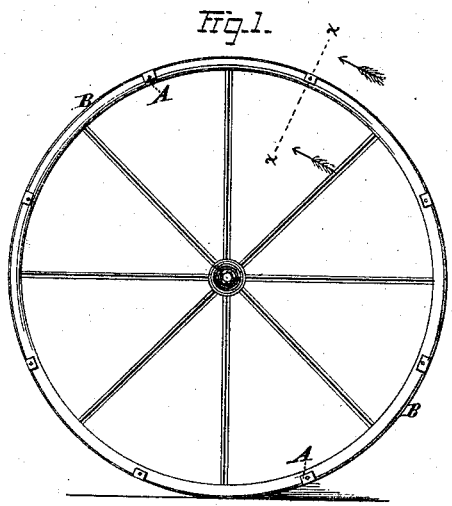
Figure 2:
Figure 3:
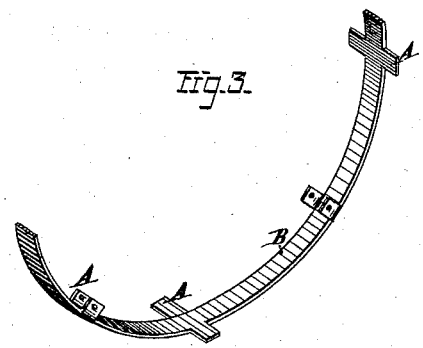

Figure 1 is a side elevation of a wheel with my improvement applied thereto. Fig. 2 is a sectional view of Fig. 1, through the dotted line $x\ x$; and Fig. 3 is a detached perspective view of a portion of the tire embodying my improvement.

Corresponding parts in the several figures are denoted by like letters.

This invention relates to a certain improvement in tire-fastenings; and it consists in the employment of flanges formed upon either side of the tire, substantially as hereinafter more fully set forth.

In the annexed drawing, B refers to a tire, having flanges A A, which are made to clamp the fellies of the wheel. The fellies of the wheel being thus embraced, or the flanges A A caused to project from the tire parallel with the former, the tire, in case of its becoming loose by expansion, or the shrinkage of the fellies, will be prevented from leaving the wheel.

To render the flanges more efficient, they may be connected to the fellies of the wheel by passing nails, screw-bolts, or other suitable fastenings through openings or holes made therein, the said fastenings passing through the fellies also.

I am aware that metallic plates with pronged ends, introduced between the tire and fellies, the prongs being so bent as to lap both the tire and fellies, are not new.

This fastening is one of great simplicity, and of easy adaptation to the ordinary tire, and with but little expense.

Having thus described my invention, what I claim, and desire to secure by Letters Patent, is—

The tire B, having flanges A A, substantially as and for the purpose specified.

In testimony whereof I have hereunto signed my name in presence of two subscribing witnesses.

WILLIAM H. ROBARTS.

Witnesses:
 THOS. I. CHAPPELL,
 G. W. LAWRENCE.